United States Patent
Huggahalli et al.

(10) Patent No.: US 12,277,071 B2
(45) Date of Patent: Apr. 15, 2025

(54) CACHE REPLACEMENT POLICY OPTIMIZATION FOR PRODUCER-CONSUMER FLOWS

(71) Applicant: Microsoft Technology Licensing, LLC, Redmond, WA (US)

(72) Inventors: Ramakrishna Huggahalli, Scottsdale, AZ (US); Shachar Raindel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/706,044

(22) Filed: Mar. 28, 2022

(65) Prior Publication Data

US 2023/0305968 A1    Sep. 28, 2023

(51) Int. Cl.
    G06F 12/128    (2016.01)
    G06F 9/30      (2018.01)
    G06F 12/0804   (2016.01)
    G06F 12/0811   (2016.01)

(52) U.S. Cl.
    CPC ........ G06F 12/128 (2013.01); G06F 9/30047 (2013.01); G06F 9/30101 (2013.01); G06F 12/0804 (2013.01); G06F 12/0811 (2013.01)

(58) Field of Classification Search
    CPC .............. G06F 12/128; G06F 12/0804; G06F 12/0811; G06F 9/30047; G06F 9/30101
    See application file for complete search history.

(56) References Cited

U.S. PATENT DOCUMENTS

| | | | |
|---|---|---|---|
| 9,715,428 B1 * | 7/2017 | Morshed | ................. G06F 11/08 |
| 9,934,231 B2 * | 4/2018 | Maybee | .............. G06F 16/1748 |
| 2010/0235579 A1 | 9/2010 | Biles et al. | |
| 2012/0151149 A1 | 6/2012 | Dubrovin et al. | |
| 2013/0042070 A1 * | 2/2013 | Jalal | ...................... G06F 12/084 |
| | | | 711/E12.033 |
| 2017/0308482 A1 | 10/2017 | Alatorre et al. | |
| 2018/0349291 A1 | 12/2018 | Klingauf et al. | |
| 2019/0004971 A1 * | 1/2019 | Butcher | .............. G06F 12/0846 |

(Continued)

FOREIGN PATENT DOCUMENTS

EP          1149342 B1      4/2007

OTHER PUBLICATIONS

"International Search Report and Written Opinion Issued in PCT Application No. PCT/US2023/010885", Mailed Date: May 12, 2023, 13 Pages.

Primary Examiner — Prasith Thammavong
(74) Attorney, Agent, or Firm — Holzer Patel Drennan (57) ABSTRACT

Embodiments of the present disclosure includes techniques for cache memory replacement in a processing unit. A first data production operation to store first data to a first cache line of the cache memory is detected at a first time. A retention status of the first cache line is updated to a first retention level as a result of the first data production operation. Protection against displacement of the first data in the first cache line is increased based on the first retention level. A first data consumption operation retrieving the first data from the first cache line is detected at a second time after the first time. The retention status of the first cache line is updated to a second retention level as a result of the first data consumption operation, the second retention level being a lower level of retention than the first retention level.

20 Claims, 7 Drawing Sheets

(56) References Cited

U.S. PATENT DOCUMENTS

2020/0310984 A1\* 10/2020 Choi ................... G06F 12/0246
2021/0157740 A1\* 5/2021 Benhanokh ......... G06F 12/0877
2022/0197798 A1\* 6/2022 Mandal ............... G06F 12/0811

\* cited by examiner

CACHE REPLACEMENT POLICY OPTIMIZATION FOR PRODUCER-CONSUMER FLOWS

BACKGROUND

The present disclosure relates to a computing system. More particularly, the present disclosure relates to techniques for managing cache memory usage.

In modern computer system architectures, streams of data flows may include frequent interactions between producers and consumers of data involving cache memory of a computer system. Cache memory is high speed memory that may be coupled to a processor and may be formed as part of a process of fabricating the processor—for example, formed using the same die or socket where a socket may contain multiple dies in a single package. The amount of data storage available in cache memory may be smaller than other types of computer system memory but has a lower read-write latency and a higher read-write bandwidth. As a result of the space constraints associated with the cache memory, the control of data input and data output may be well-characterized to prevent conflicts between data transactions and data loss. Certain challenges may arise in connection with such operations. In certain scenarios, for instance, data transactions involving the cache memory are controlled to promote host consumption of the data while minimizing interactions involving storage or access of the data using other types of memory.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Embodiments herein relate to data replacement in cache memory of a computer system. Features disclosed herein reduce the likelihood that data stored in cache memory of a processor system will be prematurely replaced prior to consumption of the stored data. One or more embodiments herein disclose implementing a retention status for a segment of the cache memory storing data. The retention status is adjusted based on transactions of components of the computer system with the segment of memory. As a result, the data stored in the segment of cache memory may be insulated against premature replacement with other data.

Figure 1:
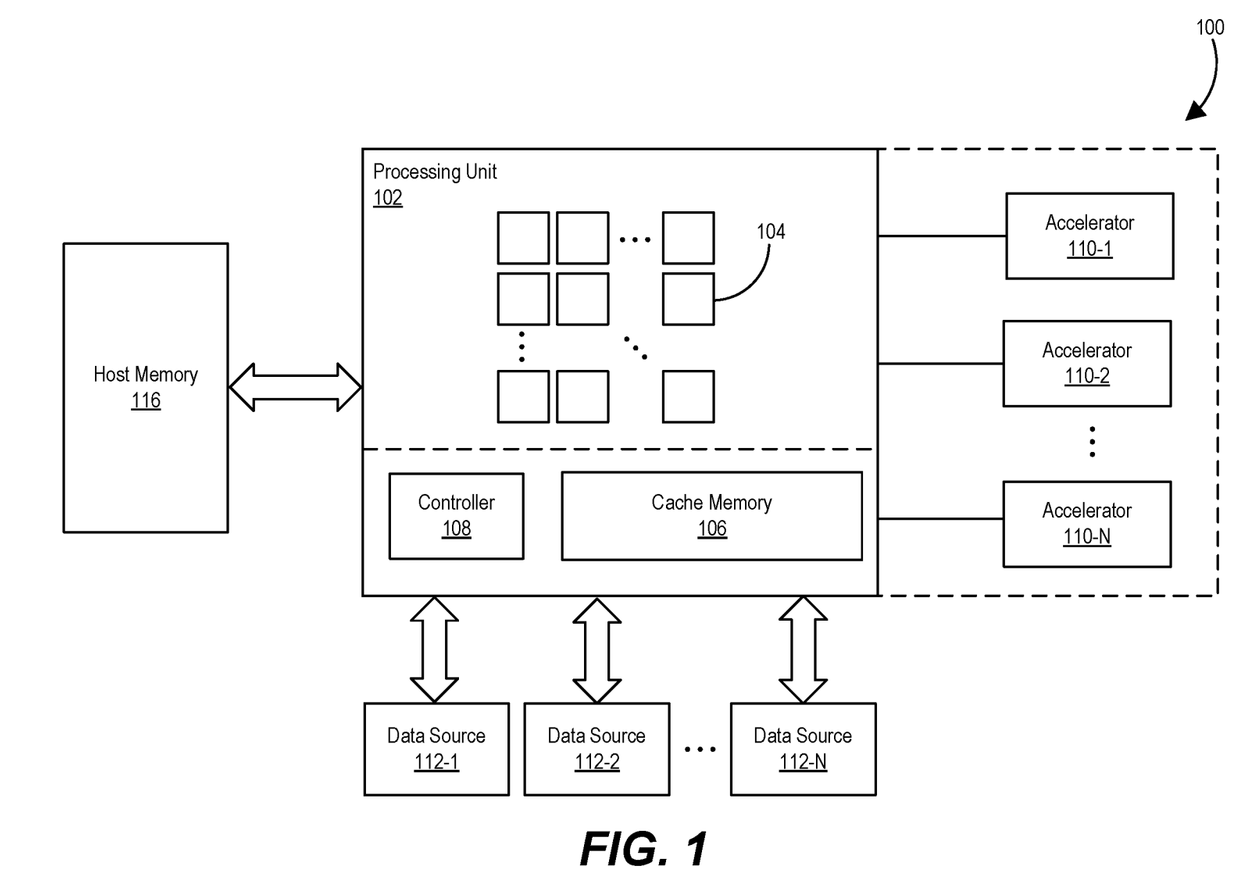
FIG. 1 illustrates an example computer system according to one or more embodiments.

FIG. 1 illustrates a computer system 100 according to one or more embodiments. The computer system 100 comprises a processing unit 102 that includes a set of processor cores 104, cache memory 106, and a controller 108 that controls data transactions involving the cache memory 106. In some embodiments, the processing unit 102 may be a system-on-chip that includes additional components not shown. In some embodiments, the components shown as part of the processing unit 100 are disaggregated silicon components on the same socket or the same package. The computer system 100 may further comprise one or more hardware accelerators 110-1, 110-2, . . . 110-N (collectively "accelerators 110"), one or more data sources 112, and host memory 114.

Individual cores of the set of processor cores 104 are configured to process data independently of other cores of the set of processor cores 104. The hardware accelerators 110 are hardware modules that are configured to offload, preprocess, decrypt, or perform other operations to improve the efficiency of the set of processor cores 104. In some embodiments, one or more of the hardware accelerators 110 are included in the processing unit 102—for example, one or more of the hardware accelerators 110 may be formed as part of the same fabrication process in which the processing unit 102 is formed. In some embodiments, one or more of the hardware accelerators 110 may be separate from the processing unit 102. One or more of the hardware accelerators 110 may be specifically configured (e.g., hard-wired) to perform one or more acceleration processes. One or more of the accelerators 110 may include software and/or firmware that, as a result of execution, causes the one or more hardware accelerators 110 to perform as described herein. The hardware accelerators 110 are communicatively coupled to the processing unit 102 and configured, in some embodiments, to retrieve data from the cache memory 106 and/or the one or more data sources 112.

The one or more data sources 112 may include a network interface controller (NIC), input/output (I/O) devices (e.g., mouse, keyboard), ports, and/or peripheral devices, by way of non-limiting example. The one or more data sources 112 may be I/O devices with or without inherent acceleration capabilities. The one or more data sources 112 may include storage devices comprising one or more types of non-volatile (e.g., read-only) memory, such as solid-state memory, a hard disk drive, electrically erasable programmable read-only memory, and flash memory, by way of non-limiting example. The host memory 114 is a region of random-access or volatile memory that is accessible by and visible primarily to the processing unit 102.

Figure 2:
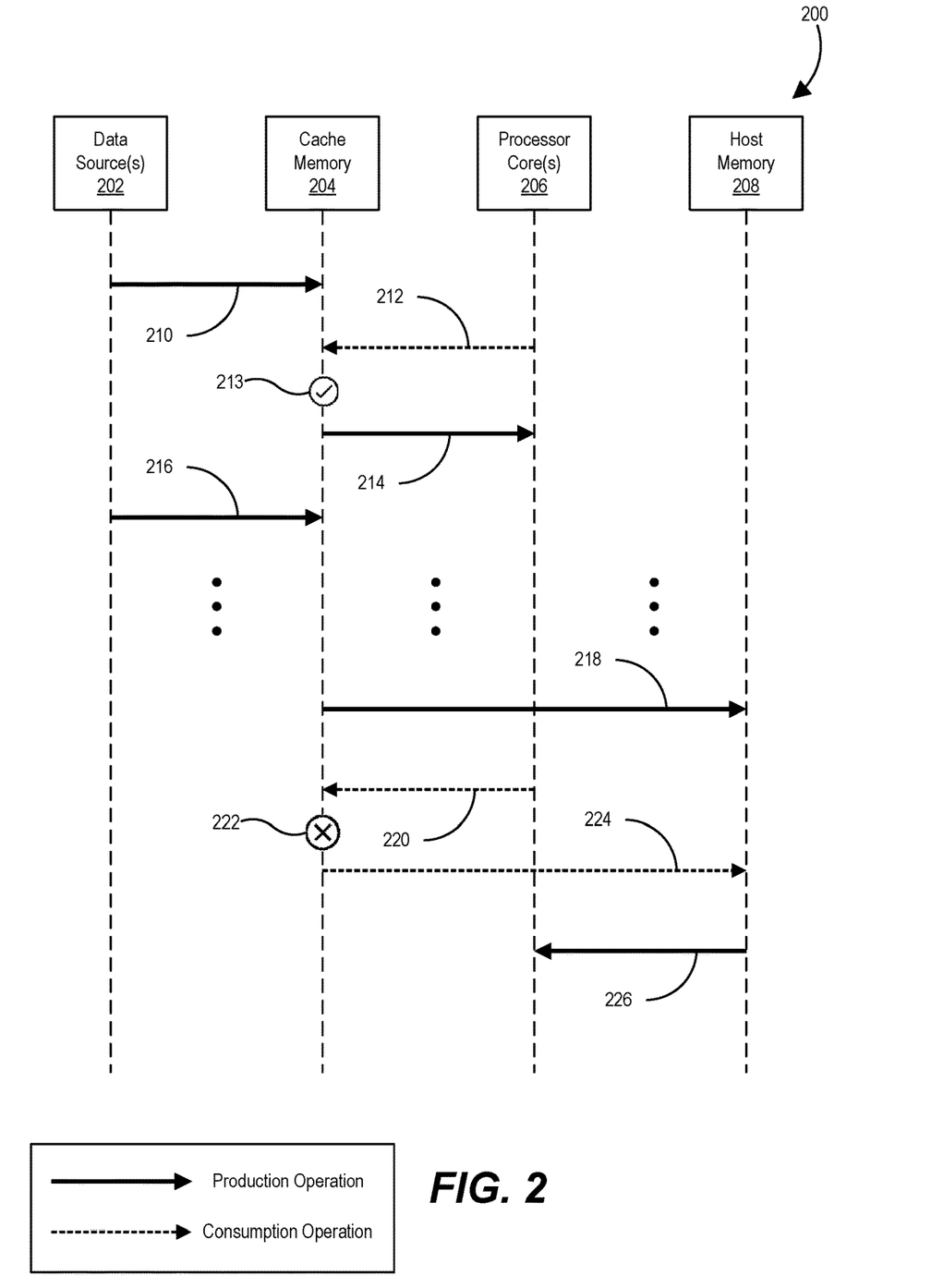
FIG. 2 illustrates a first example flow diagram in which components of the computer system of FIG. 1 manage cache memory according to one or more embodiments.

FIG. 2 illustrates a first example flow diagram 200 in which components of the computer system 100 manage cache memory according to one or more embodiments. The flow diagram 200 includes data transactions involving one or more data sources 202, cache memory 204, one or more processor cores 206, and host memory 208. The host memory 208 may include data transactions involving the host memory 114 described with respect to FIG. 1. The phrase "data transactions," as used herein, refers to operations in which data is produced to or from the cache 204 or consumed by another entity from the cache 204. The production of data involves the allocation of data to memory whereas the consumption of data involves reading of data from memory. Consumption of data involves a request to read a line of the cache 204 by another component. However, not all read operations are consumption operations that are associated with special replaceability attributes, as discussed supra.

Referring to FIG. 2, the data source 202 performs a write operation 210 (e.g., write-64B) in which data is produced to a line of the cache 204. The processor core 206 issues a request 212 (e.g., read-64B) to read the line of the cache 204 to which the data source 202 produced in the write operation 210. The request 212 is a consumption operation that may include information identifying the particular line to be read in the cache 204. The cache 204 accesses information associated with the cache line requested and determines that the cache line is storing allocated data (e.g., from the write operation 210). As a result, the cache 204 registers a cache hit 213 and enables the processor core 206 to perform a read operation 214 producing the data from the line of the cache 204 to the processor core 206.

Subsequent to the read operation 214, the data source 202 performs a write operation 216 producing data to be stored in the line of the cache 204. After a time period in which the line of cache 204 is unread by another component, the data stored in the line of cache 204 may be evicted as a result of a cache replacement policy implemented by the controller 108 of FIG. 1. A non-limiting example of such a cache replacement policy is a Least-Recently Used (LRU) policy in which an unused line of the cache 204 is replaced with new data or marked as available for writing. For instance, an eviction operation 218 may be performed in which the data stored in the line of cache 204 is produced or written to host memory 208 (e.g., RAM, ROM).

Thereafter, the processor core 206 issues a request 220 to read or consume data stored in the line of the cache 204 to which the data source 202 wrote in the write operation 216. The cache 204 determines that the data previously produced in the write operation 216 is unavailable in the line of cache 204 and registers a cache miss 222. The cache 204 (e.g., via the controller 108) issues a read operation 224 to the host memory 208 to retrieve the data produced in the write operation 216. As shown in FIG. 2, the read operation 224 corresponds to a consumption operation in the flow diagram 200. In response to successfully obtaining the requested data from the host memory 208, a read operation 226 is performed in which the processor core 206 reads the data from the host memory 208.

Reading data from the host memory 208 involves use of a greater amount of time and computing resources than reading data from the cache 204. As a result of the cache miss 220 and subsequent read operations 224 and 226, the efficiency of cache allocation is significantly reduced. In some scenarios, the data stored in the line of cache 204 may be overwritten or corrupted, rendering cache allocation ineffective.

Figure 3:
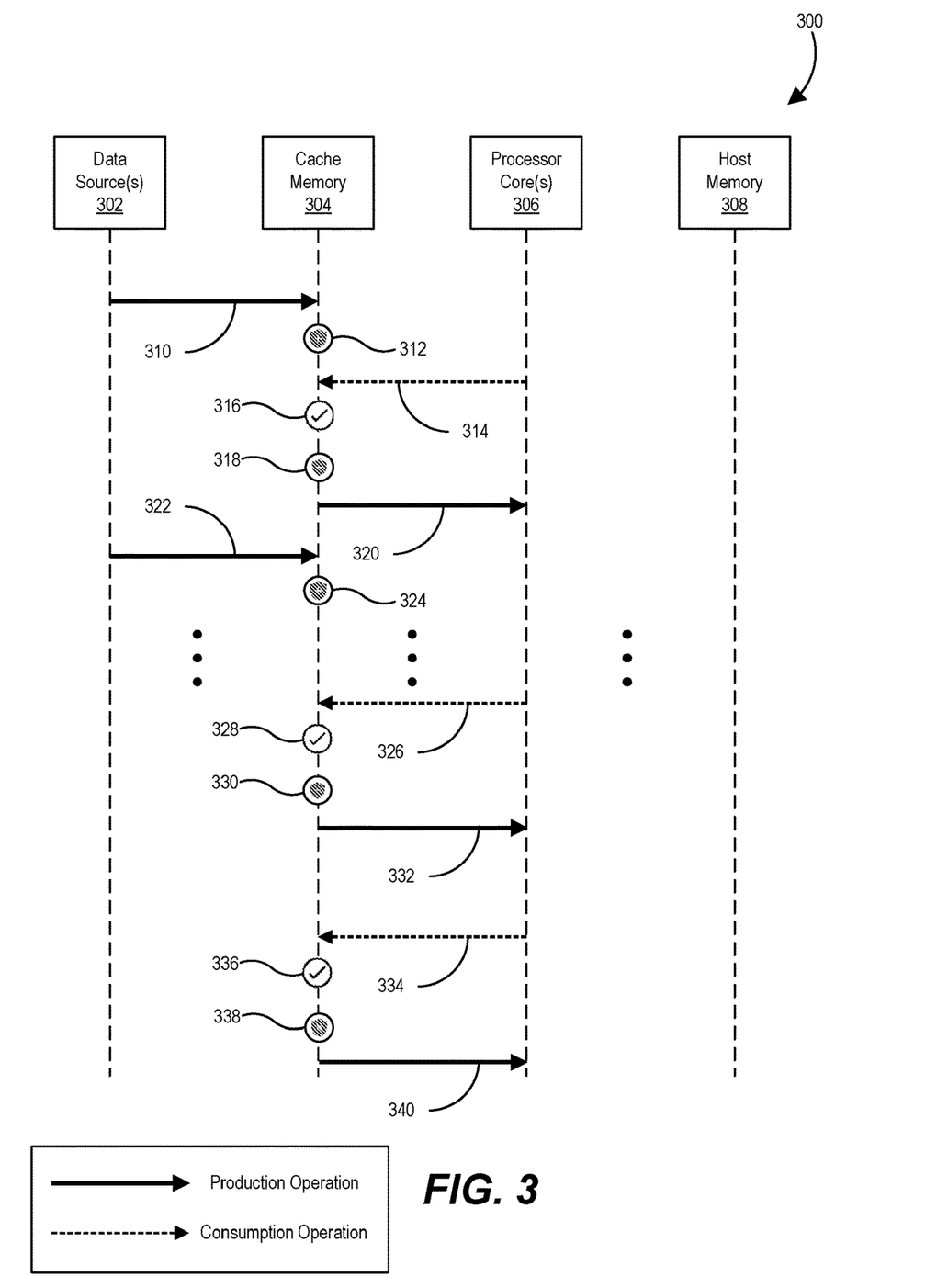
FIG. 3 illustrates a second example flow diagram in which components of the computer system of FIG. 1 manage cache memory according to one or more embodiments.

FIG. 3 illustrates a second example flow diagram 300 in which components of the computer system 100 manage cache memory according to one or more embodiments. The computer system operating in the flow diagram 300 is configured differently than the computer system operating in the flow diagram 200. More particularly, the computer system of the flow diagram 300 is configured to implement a retention status for individual lines of cache memory. The flow diagram 300 data transactions involving one or more data sources 302, cache memory 304, one or more processor cores 306, and/or memory 308. Various features of the flow diagram 300 are substantially similar to features described with respect to the flow diagram 200 and elsewhere herein, so further description thereof is omitted for brevity.

In the flow diagram 300, the data source 302 performs a write operation 310 (e.g., write-64B) in which data is produced to a line of the cache 304. As a result of performance of the write operation 310, a retention status update 312 to a retention status of the line of the cache 304 is implemented. In the retention status update 312, the retention status of the cache line is updated to a first level in which data stored in the line of the cache 304 has an increased level of retention or protection against overwriting or deletion of contents of the data in the line of the cache 304. For instance, data associated with the line of the cache 304 may indicate a level of retention to be associated with data stored in the line of the cache 304. A cache memory controller (e.g., controller 108) may control data interactions with the line of the cache 304 based on the level of retention.

The processor core 306 issues a request 314 (e.g., read-64B) to read the line of the cache 304 to which the data source 302 produced in the write operation 310. The request 314 is a consumption operation that may include information identifying the particular line to be read in the cache 304. The cache 304 accesses information associated with the cache line requested and determines that the cache line is storing allocated data (e.g., from the write operation 310). The cache 304 registers a cache hit 316 and a retention status update 318 to the retention status of the cache line is implemented as a result of the consumption operation. More particularly, the retention status update 318 is a reduction to a second level of retention for the cache line, the second level of retention being lower than the first level of retention. The retention status update 318 may be performed by the controller of the cache memory 304, such as the controller 108.

In response to the cache hit 318, the processor core 306 completes a read operation by receiving corresponding read data 320 from the line of the cache 304. Subsequent to the receipt of the read data 320, the data source 302 performs a write operation 322 producing data to be stored in the line of the cache 304. In response to the write operation 322, a retention status update 324 is implemented for a level of a retention status of the line of the cache 304 is updated to the first level, which is an increased level of retention against overwriting or deletion of the data stored in the cache line.

After a time period in which the line of cache 304 is unread by another component, the processor core 306 issues a request 326 (e.g., read-64B) to read the line of the cache 304 that the data source 302 produced in the write operation 322. The request 326 is a consumption operation that may include information identifying the particular line to be read in the cache 304. The cache 304 accesses information associated with the cache line requested and determines that the cache line is storing allocated data (e.g., from the write operation 322). The cache 304 registers a cache hit 328 and the cache 304 performs a retention status update 330 to the retention status of the cache line as a result of the consumption operation. The retention status update 330 is a reduction to a second level of retention for the cache line, the second level of retention being lower than the first level of retention.

In response to the cache hit 328, the processor core 306 completes a read operation by receiving corresponding read data 328 from the line of the cache 304. Subsequent to the receipt of the read data 320, the processor core 306 issues a request 334 (e.g., read-64B) to read the line of the cache 304 to which the data source 302 produced in the write operation 322. The request 334 is a consumption operation that may include information identifying the particular line to be read in the cache 304. The cache 304 accesses information associated with the cache line requested and determines that the cache line is storing allocated data (e.g., from the write operation 322).

The cache 304 registers a cache hit 336 and performs a retention status update 338 to the retention status of the cache line a result of the consumption operation. The retention status update 338 is a further reduction to a third level of retention for the cache line, the third level of retention being lower than the second level of retention. In some embodiments, the third level of retention is a retention level in which the data stored in the cache line is designated for eviction or is otherwise uninsulated from removal or overwrite. In some embodiments, there may be more than three levels of retention, each successive level having a lower level of retention than the previous level.

In some embodiments, the cache line having the third retention level is transitioned to a different cache replacement policy. For example, the cache line may be included in a collection of cache lines of the cache memory 304 for which a different cache replacement policy is implemented. Non-limiting examples of such cache replacement policies include LRU, most-recently used, least-frequently used, last in first out, and/or first in last out. In response to the cache hit 336, the processor core 306 completes a read operation by receiving corresponding read data 320 from the line of the cache 304.

Figure 4:
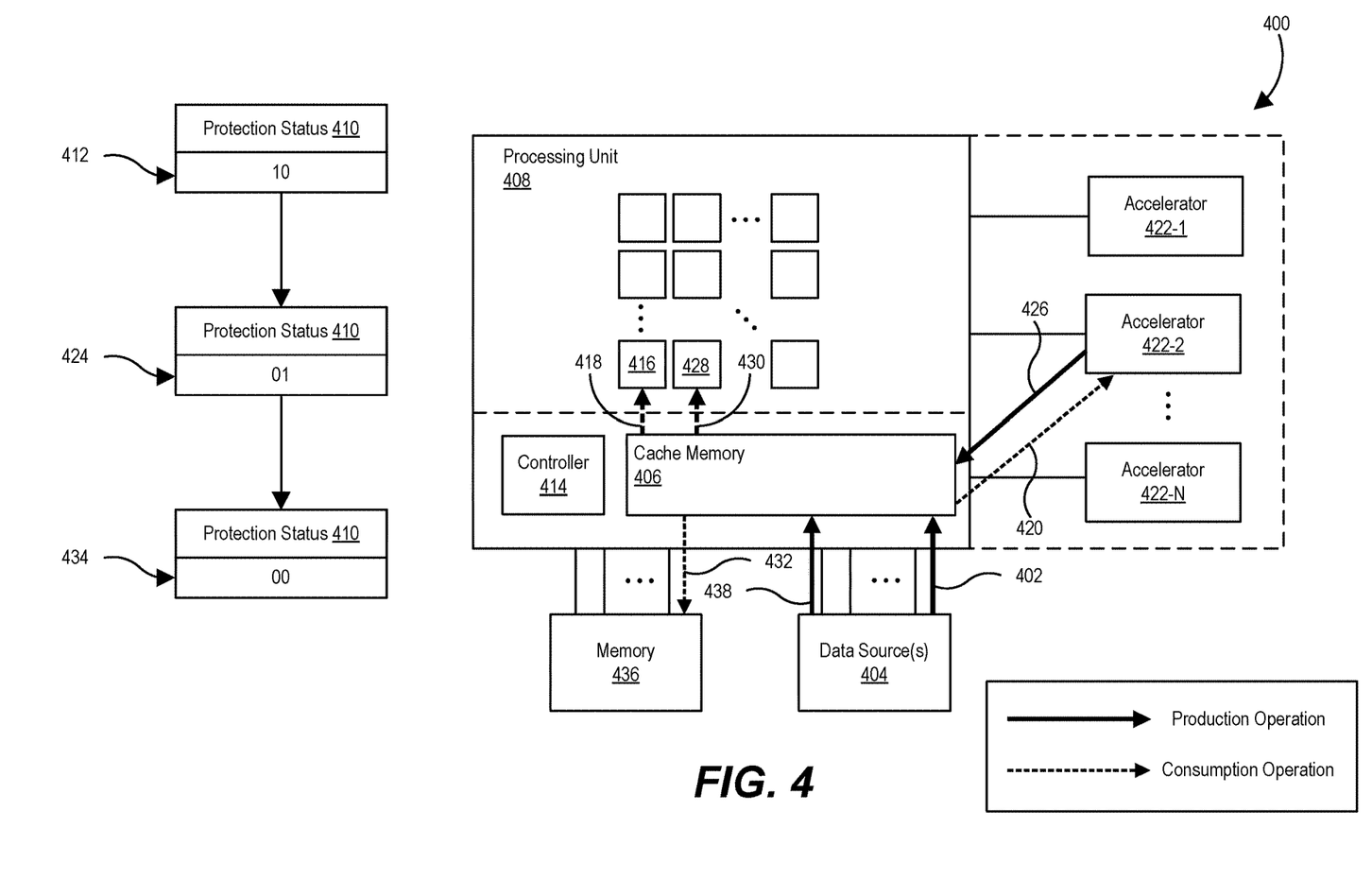
FIG. 4 illustrates a set of data transactions implemented in the computer system of FIG. 1 according to one or more embodiments.

FIG. 4 illustrates a set of data transactions implemented in a computer system 400 according to one or more embodiments. The components of the computer system 400 correspond to the components described with respect to the computer system 100, so further description thereof is omitted for brevity. The data transactions involved in the computer system 400 include production operations and consumption operations, as described with respect to the flow diagrams 200 and 300. Although not shown, the computer system 400 may include host memory, such as the host memory 114 discussed with respect to FIG. 1.

In FIG. 4, a write operation 402 is performed in which a data source 404 produces data to a line of cache memory 406 of a processing unit 408. A controller 414 of the processing unit 408 updates a retention status 410 of the cache line to a first retention level 412 in response to the write operation 402, as discussed with respect to FIG. 3. The retention status 410 may correspond to a set of bits in a register of the processing unit 408 defining a replacement policy applied to regions of the cache memory 406. A controller 414 of the processing unit 408 may maintain the retention status 410 for individual lines of the cache memory 406 in some embodiments. Performance of a production operation, such as the write operation 402, may cause the controller 414 to set a defined state for the retention status 410. For instance, the controller 414 may inject a defined value into the retention status 410 in response to a production operation performed for a cache line.

Some consumption operations may not affect the retention status 410. Some data may include associated metadata for which consumption operations may not affect the retention status 410. As a non-limiting example, data packets transmitted over a network may include a header indicating, e.g., a source address, a destination address, a packet length, and a protocol identifier. The write operation 402 may include production of a network data packet to one or more lines of the cache memory 406. A processor core 416 may perform a read operation 418 obtaining or consuming metadata associated with the network data packet. The read operation 418 may not affect the first retention level 412 of the retention status 410. Performance of subsequent data transactions associated with the computer system 400 may be based on the metadata processed by the processor core 416 via the read operation 418.

A read operation 420 is performed in which the data written in the write operation 402 is consumed by an accelerator 422-2 of a set of accelerators 422-1, 422-2, . . . 422-N described with respect to FIG. 1. As a result of the read operation 420, the retention status 410 of the cache line is updated to a second retention level 424 that is lower than the first retention level 412. The accelerator 422-2 processed the data read in the read operation 420, such as by decrypting the data using a cryptographic key accessible by the accelerator 422-2 to produce decrypted data. A write operation 426 is performed in which the processed data is produced to a cache line of the cache memory 406. A retention status 410 is updated to the first retention level 412 for the cache line storing the data produced in the write operation 426. The read operation 420 and the write operation 426 may be respectively to and from independent cache lines that have different memory addresses.

A second core 428 of the processing unit 408 performs a read operation 430 consuming data stored on the cache line of the cache memory 406. The retention status 410 of the cache line is updated to the second retention level 424 as a result of the read operation 430. Another read operation 432 is performed in which the data stored in the cache line is consumed by memory 436 coupled to the processing unit 408. The read operation 432 causes the retention status 410 to be updated to a third retention level 434 lower than the second retention level 434. The controller 414 may then transition the cache line to a different cache replacement policy, such as the LRU policy described herein. The data source 404 may then perform a write operation 438 producing data to the cache line and overwriting the data consumed in the read operations 430 and 432.

For the cache replacement policy described herein, a cache line of the cache memory 406 having the second retention level 424 as a retention status 410 may be insulated against data writes over other cache replacement policies, such as the LRU or MRU policies mentioned herein. Data stored in cache lines having the second retention level 424 may be overwritten, evicted, or otherwise displaced if, for example, additional cache memory space is requested to fulfill data write operations of another replacement policy.

A cache line of the cache memory 406 having the first retention level 412 as a retention status 410 may be insulated against data writes over cache lines having the second retention level 424. Therefore, data stored in cache lines having the first retention level 412 may be insulated from being displaced if additional cache memory space is requested to fulfill data write operations of another replacement policy and all cache memory having the second retention level 424 has already been utilized.

A cache line of the cache memory 406 having the third retention level 434 may be included in a collection of cache lines uninsulated according to the cache replacement procedure described herein. Data transactions involving such cache lines are implemented according to a different cache replacement procedure or policy (e.g., LRU, MRU, LIFO).

The retention status 410 of such cache lines may be updated to the first retention level 412 as a result of data being produced to the cache lines.

In some embodiments, there may be more retention levels than three. The controller 414 may update the retention status 410 of a cache line to the highest retention level (e.g., first retention level 412) in response to detecting data production to the cache line. For certain consumption operations to the cache line (e.g., read operations), the controller 414 may reduce or decrement the retention status 410 until the retention status 410 reaches a lowest retention level (e.g., third retention level 434).

Figure 5:
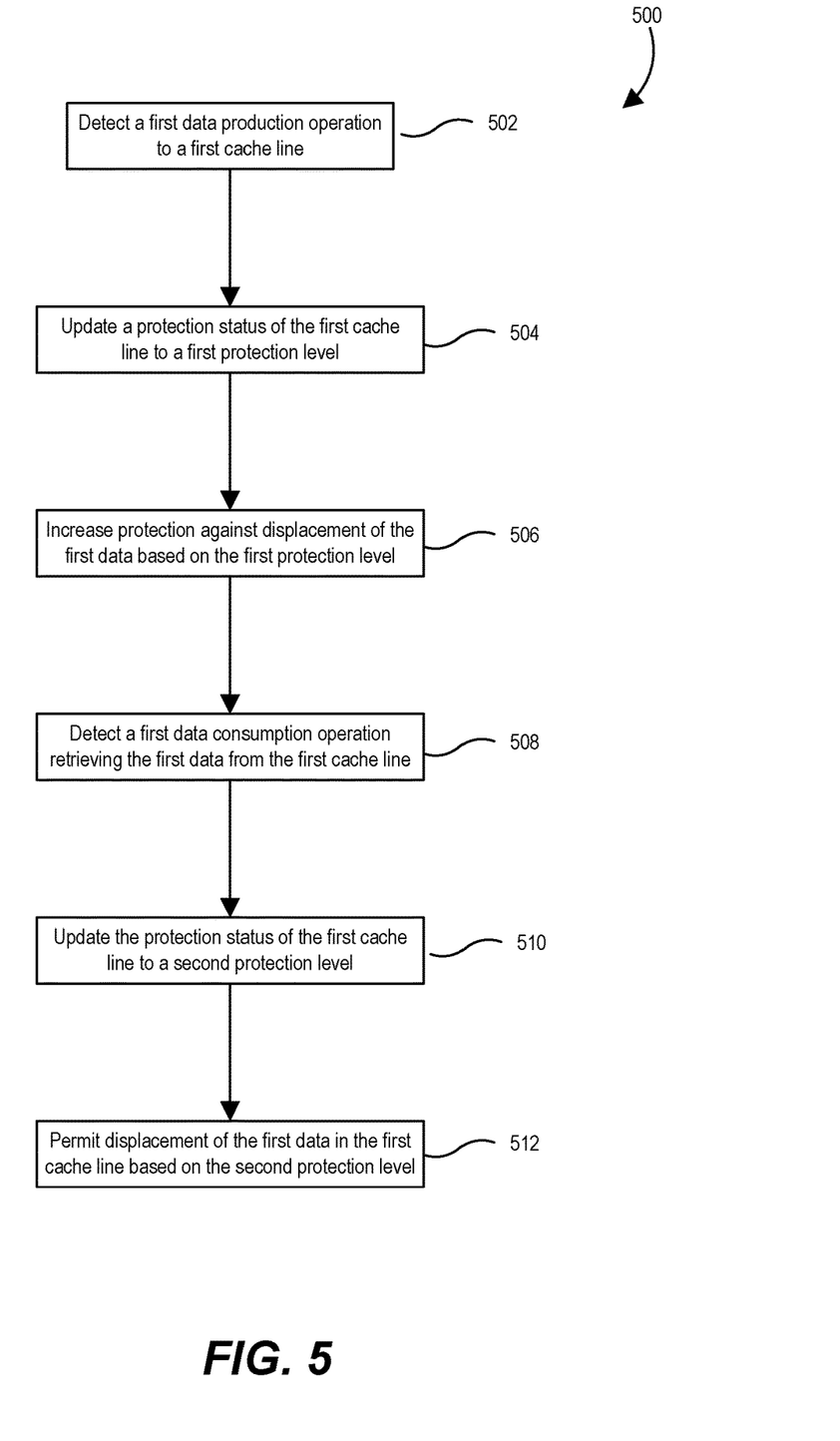
FIG. 5 illustrates a method for reducing a probability that data stored in cache memory of a processor system will be prematurely replaced according to one or more embodiments.

FIG. 5 shows a method 500 for reducing a probability that data stored in cache memory of a processor system will be prematurely replaced according to one or more embodiments. The method 500 may be performed by one or more appropriate entities described herein, such as the controller 108 of the computer system 100. The method 500 includes detecting, at 502, a first data production operation to store first data to a first cache line of the plurality of cache lines. In 502, the controller 108 may detect, for example, performance of the write operation 402 by the data source 404 to a first cache line of the cache memory 406.

The method 500 also includes updating, at 504, a retention status of the first cache line to a first retention level as a result of the first data production operation detected in 502. Updating the retention status of the first cache line to the first retention level in 504 may include setting a register of the controller 414 to a defined value. For instance, updating the retention status in 504 may include setting, by the controller 414, a set of bits assigned to the retention status 410 to a defined value, such as the binary value "11" indicated as corresponding to the first retention level 412 in FIG. 4. The first retention level 412 is a high level of retention in which the data produced and stored in the first cache line in 502 is preserved.

At 506, the method 500 includes increasing protection against displacement of the first data in the first cache line based on the update of the retention status to the first retention level. Increasing protection against displacement in 506 may include increasing protection against overwriting, eviction, deletion, or otherwise altering the contents of the first cache line. In some embodiments, increasing protection against displacement of the first data in 510 may include preventing displacement of the first data in the first cache line. As an example, the controller 414 may receive a request to store second data obtained by the data source 402. The controller 414 may observe that the first cache line has the first retention level 412 and exclude the first cache line from consideration as a candidate to store the second data. The controller 414 may evict data from another cache line having a lower level of retention, as discussed with respect to the eviction operation 218 of FIG. 2. In some embodiments, increasing protection against displacement may include modifying a numerical value or a flag associated with the first cache line.

The method 500 further includes detecting, at 508, a first data consumption operation to retrieve the first data from the first cache line. Detection of the first data consumption operation in 508 may be performed at a time subsequent to detection of the first data production operation in 502. Detecting the first data consumption operation in 508 may correspond to detecting the consumption operation 420 or 430 in FIG. 4.

The method 500 proceeds to updating, at 510, the retention status of the first cache line to a second retention level as a result of the first data consumption operation detected in 508. The second retention level is a lower level of retention than the first retention level, such as the second retention level 424 or the third retention level 434 of FIG. 4. Updating the retention status to the second retention level in 510 may include adjusting a value of the retention status 410 (e.g., register of the processing unit 408) by a defined amount. For instance, the controller 414 may decrement the value of the first retention level 412 by a defined amount, such as one, to achieve the second retention level 424 having a binary value of "01."

In some embodiments, updating the retention status in 510 may include moving the first data from a first LRU queue to a second LRU queue. For instance, at a first time subsequent to detecting the first data consumption operation in 508, the first data may be moved from a dedicated LRU for data that has been written but not read to the top of another LRU queue. Then, at a second time after the first time, the retention status of the first cache line is updated to the second retention level. In such embodiments, in 510 and during an interim period between the first and second time, the retention status of the first data in the first cache line may be temporarily different than the second protection level.

The method 500 may include permitting, at 512, displacement of the first data stored on the first cache line based on the second retention level. Permitting in 512 may include implementing a different cache replacement policy for the first cache line based on the second retention level. The different cache replacement policy may be an LRU cache replacement policy or other such policy discussed herein or known to those skilled in the art.

Figure 6:
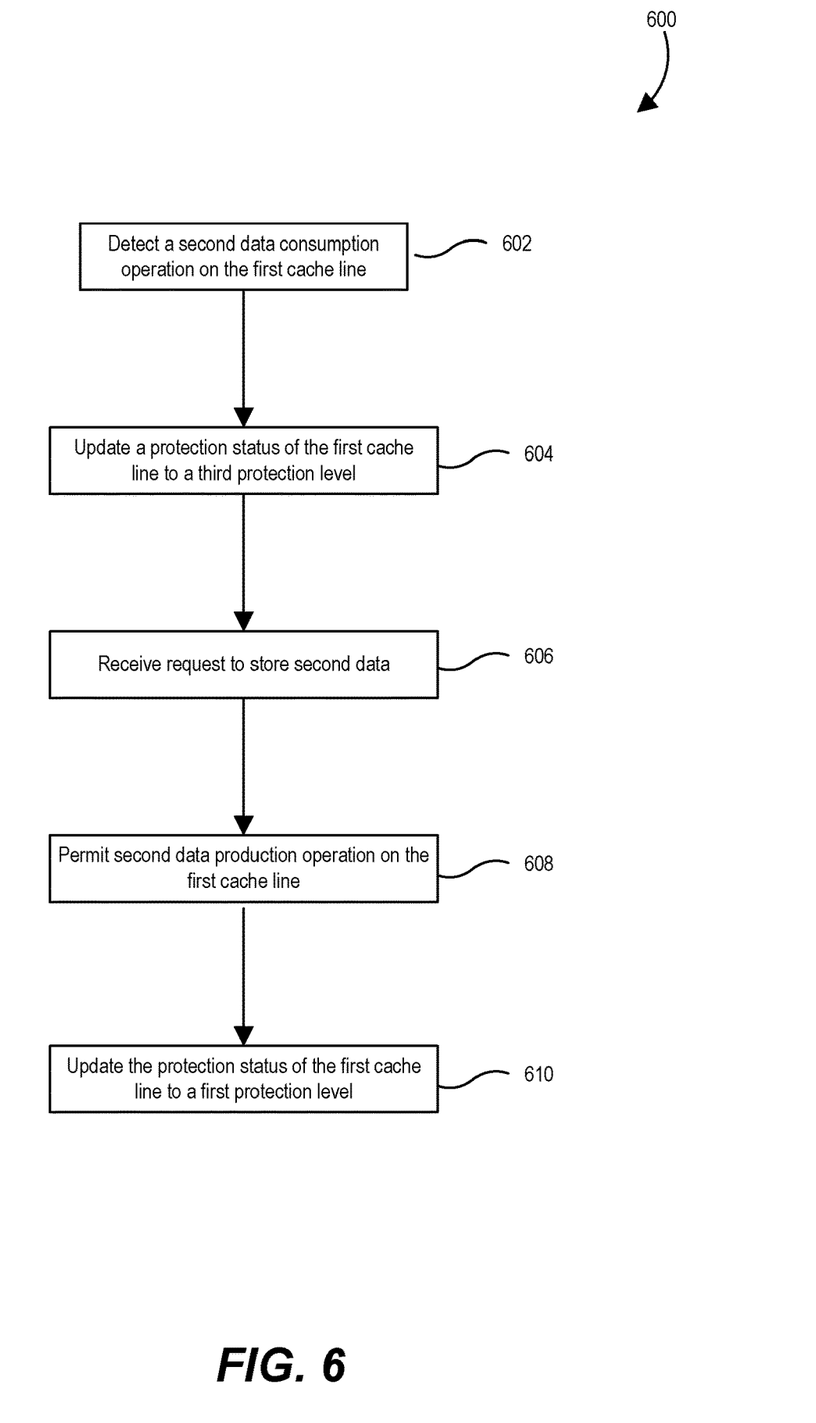
FIG. 6 illustrates a method for reducing a probability that data stored in cache memory of a processor system will be prematurely replaced according to one or more embodiments.

FIG. 6 illustrates a method 600 for reducing a probability that data stored in cache memory of a processor system will be prematurely replaced according to one or more embodiments. The method 600 may be performed by one or more appropriate entities described herein, such as the controller 108 of the computer system 100. The method 600 may be performed subsequent to or as part of the method 500.

The method 600 includes detecting, at 602, a second data consumption operation to retrieve the first data from the first cache line. Detection of the second data consumption operation in 602 is, in some embodiments, performed prior to permitting displacement of the first data stored on the first cache line in 512. For instance, detection of the second data consumption in 602 may be performed subsequent to updating the retention status in 510 and before permitting displacement of the first data in 512. As another example, detection of the second data consumption in 602 may be performed subsequent to increasing protection against displacement in 506, but before detecting the first data consumption operation in 508.

The method 600 further includes updating, at 604, the retention status to a third retention level lower than the second retention level as a result of the second data consumption operation detected in 602. Updating the retention status in 604 may include adjusting a value of the retention status 410 (e.g., register of the processing unit 408) by a defined amount. For instance, the controller 414 may decrement the value of the second retention level 424 by a defined amount, such as one, to achieve the third retention level 434 having a binary value of "00."

The method 600 also includes receiving, at 606, a request to store second data. The request may be received by the controller 414 by another entity in the computer system 400, such as the data source 402, one of the accelerators 422, or one of the cores of the processing unit 408. The method 600 includes permitting, at 608, a second data production operation to store the second data received to the first cache line.

The controller 414 may permit the second data production operation as a result of the third retention level 434 of the first cache line of the cache memory 406. The method 600 proceeds to updating, at 610, the retention status of the first cache line to the first retention level as a result of the second data production operation. More particularly, the controller 414 updates the retention status 410 of the first cache line to a defined value, such as the binary value "10" corresponding to the first retention level 412 in FIG. 4.

Example Computer System

Figure 7:
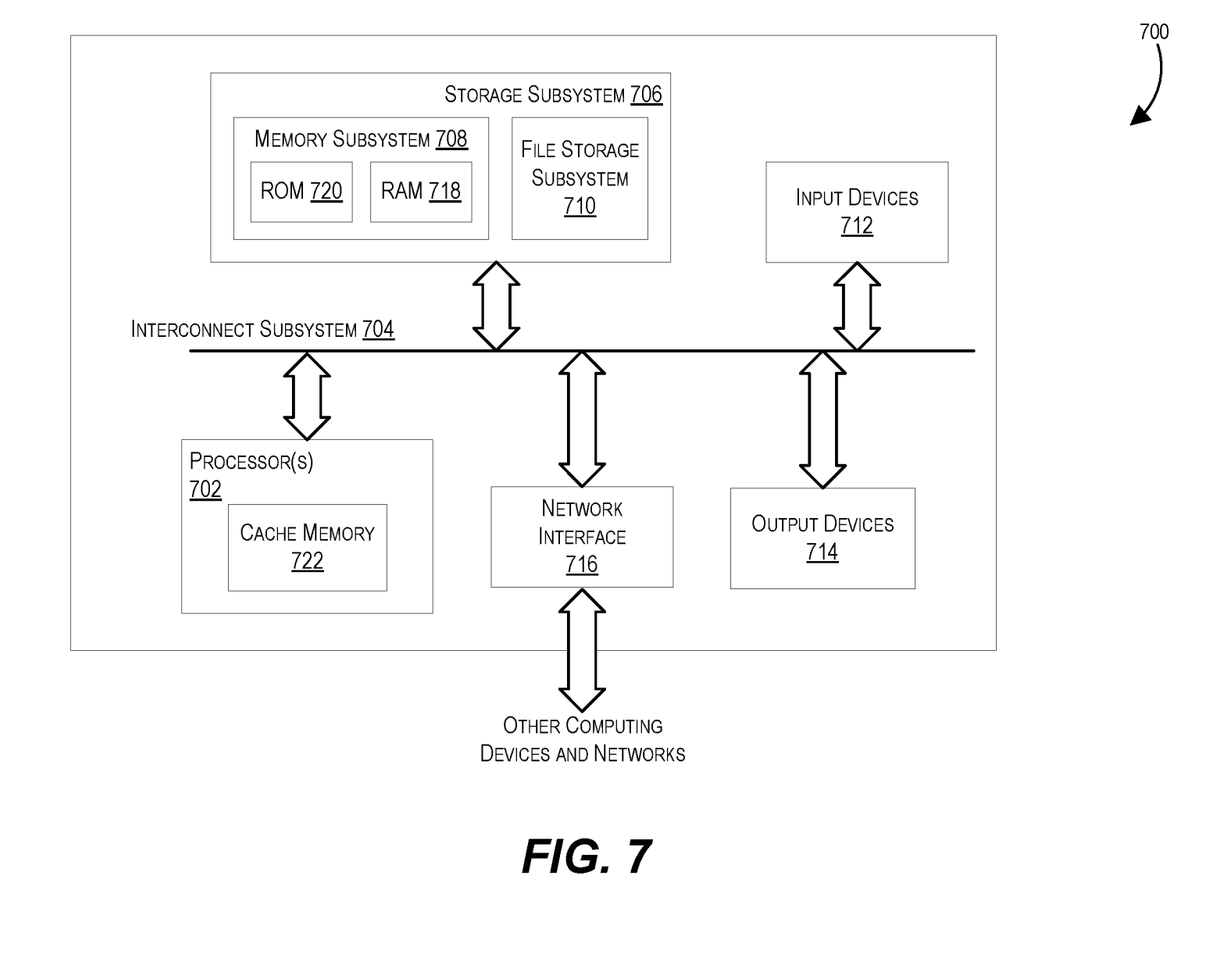
FIG. 7 illustrates a simplified block diagram of an example computer system according to one or more embodiments.

FIG. 7 depicts a simplified block diagram of an example computer system 700 according to certain embodiments. Computer system 700 can be used to implement any of the computing devices, systems, or servers described in the foregoing disclosure. As shown in FIG. 7, computer system 700 includes one or more processors 702 that communicate with a number of peripheral devices via a interconnect subsystem 704. These peripheral devices include a storage subsystem 706 (comprising a memory subsystem 708 and a file storage subsystem 170), user interface input devices 712, user interface output devices 714, and a network interface subsystem 716.

Interconnect subsystem 704 can provide a mechanism for letting the various components and subsystems of computer system 700 communicate with each other as intended. Although interconnect subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., an Ethernet card, a Wi-Fi and/or cellular adapter, a modem (telephone, satellite, cable, ISDN, etc.), digital subscriber line (DSL) units, and/or the like.

User interface input devices 712 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 700.

User interface output devices 714 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 700.

Storage subsystem 706 includes a memory subsystem 708 and a file/disk storage subsystem 710. Subsystems 718 and 720 represent non-transitory computer-readable storage media that can store program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. The processor(s) 702 include cache memory 722 communicatively coupled to processor cores of the processor(s) 702.

It should be appreciated that computer system 700 is illustrative and many other configurations having more or fewer components than system 700 are possible.

Further Embodiments

Embodiments of the present disclosure include a processing unit comprising cache memory that includes a plurality of cache lines. The controller further comprising a controller coupled to the cache memory and configured to detect, at a first time, a first data production operation to store first data to a first cache line of the plurality of cache lines; update a retention status of the first cache line to a first retention level as a result of the first data production operation; increase protection against or prevent displacement of the first data in the first cache line based on the first retention level; detect, at a second time after the first time, a first data consumption operation retrieving the first data from the first cache line; and update the retention status of the first cache line to a second retention level as a result of the first data consumption operation, the second retention level being a lower level of retention than the first retention level.

In some embodiments, the controller is configured to permit displacement of the first data stored on the first cache line based on the second retention level. In some embodiments the controller is configured to detect, at a third time after the second time, a second data consumption operation retrieving the first data from the first cache line; and update the retention status of the first cache line to a third retention level lower than the second retention level as a result of the second data consumption operation. In some embodiments, the controller is configured to implement a different cache replacement policy for the first cache line based on the second retention level.

In some embodiments, the update of the retention status to the first retention level includes setting a register of the processing unit to a defined value, and the update of the retention status to the second retention level includes adjusting the value in the register by a defined amount. In some embodiments, the controller is configured to detect, at a third time after the second time, a second data production operation to store second data to the first cache line; and update the retention status of the first cache line to the first retention level as a result of the second data production operation. In some embodiments, the controller is configured to receive, at a third time after the first time and before the second time, a request to store second data; permit a second data production operation to store the second data to a second cache line of the plurality of cache lines as a result of the first retention level of the first cache line; and update a retention status of the second cache line to the first retention level as a result of the second data production operation.

Embodiments of the present disclosure include a method comprising detecting, at a first time, a first data production operation to store first data to a first cache line of a processing unit; updating a retention status of the first cache line to a first retention level as a result of the first data production operation; increasing protection against or preventing displacement of the first data in the first cache line based on the first retention level; detecting, at a second time after the first time, a first data consumption operation retrieving the first data from the first cache line; and updating the retention status of the first cache line to a second retention level as a result of the first data consumption operation, the second retention level being a lower level of retention than the first retention level.

In some embodiments, the method comprises permitting displacement of the first data stored on the first cache line based on the second retention level. In some embodiments, the method comprises detecting, at a third time after the second time, a second data consumption operation retrieving the first data from the first cache line; and updating the retention status of the first cache line to a third retention level lower than the second retention level. In some embodiments, the method comprises implementing a different cache replacement policy for the first cache line based on the second retention level. In some embodiments, updating the retention status to the first retention level includes setting a register of the processing unit to a defined value, and updating the retention status to the second retention level includes adjusting the value in the register by a defined amount.

In some embodiments, the method comprises detecting, at a third time after the second time, a second data production operation to store second data to the first cache line; and updating the retention status of the first cache line to the first retention level as a result of the second data production operation. In some embodiments, the method comprises receiving, at a third time after the first time and before the second time, a request to store second data; permitting a second data production operation to store the second data to a second cache line of the plurality of cache lines based on the first retention level of the first cache line; and updating a retention status of the second cache line to the first retention level as a result of the second data production operation.

Embodiments of the present disclosure include a computer system comprising a processing unit that includes a processor core, cache memory, and a controller. The computer system further comprising a data source communicatively coupled to the processing unit, the controller being configured to detect, at a first time, a first data production operation to store first data provided by the data source to a first cache line of the cache memory; update a retention status of the first cache line to a first retention level as a result of the first data production operation; increase protection against or prevent displacement of the first data in the first cache line based on the first retention level; detect, at a second time after the first time, a first data consumption operation retrieving the first data from the first cache line; and update the retention status of the first cache line to a second retention level as a result of the first data consumption operation, the second retention level being a lower level of retention than the first retention level.

In some embodiments, the controller is configured to detect, at a third time after the first time and before the second time, a second data consumption operation involving the first data stored on the first cache line; and maintaining the first retention level of the first cache line as a result of the second data consumption operation. In some embodiments, the second data consumption operation involves a read operation of metadata of the first data. In some embodiments, the controller is configured to detect, at a third time after the second time, a second data consumption operation in which a first processor core reads the first data from the first cache line; and update the retention status of the first cache line to a third retention level lower than the second retention level as a result of the second data consumption operation.

In some embodiments, the controller is configured to permit displacement of the first data stored on the first cache line based on the second retention level. In some embodiments, the controller is configured to receive, at a third time after the first time and before the second time, a request to store second data; permit a second data production operation to store the second data to a second cache line of the plurality of cache lines as a result of the first retention level of the first cache line; and update a retention status of the second cache line to the first retention level as a result of the second data production operation.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

The invention claimed is:
1. A processing unit comprising:
cache memory including a plurality of cache lines; and
a controller coupled to the cache memory and configured to:
  store, for a plurality of cache lines, retention statuses that designate different respective retention levels, the different respective retention levels including at least:
    a first retention level that is assigned to cache lines managed according to a first cache replacement policy based on frequency of access; and
    a second retention level that provides increased protection against data displacement relative to the first retention level;
  detect, at a first time, a first data production operation to store first data to a first cache line of the plurality of cache lines;
  set, based on storing the first data to the first cache line, a retention status of the first cache line to the second retention level;
  detect, at a second time after the first time, a first data consumption operation retrieving the first data from the first cache line; and
  update, based on retrieving the first data from the first cache line, the retention status of the first cache line to the first retention level.

2. The processing unit of claim 1, the controller configured to:
permit displacement of the first data stored on the first cache line based on the first retention level.

3. The processing unit of claim 1, the controller configured to:
detect, at a third time after the second time, a second data consumption operation retrieving the first data from the first cache line; and
update the retention status of the first cache line to a third retention level different than the first retention level and the second retention level as a result of the second data consumption operation.

4. The processing unit of claim 3, the controller configured to:
implement a different cache replacement policy for the first cache line based on the third retention level.

5. The processing unit of claim 1, wherein the update of the retention status to the first retention level includes setting a register of the processing unit to a defined value, and the update of the retention status to the second retention level includes adjusting the value in the register by a defined amount.

6. The processing unit of claim 5, the controller configured to:
detect, at a third time after the second time, a second data production operation to store second data to the first cache line; and
update the retention status of the first cache line to the second retention level as a result of the second data production operation.

7. The processing unit of claim 1, the controller configured to:
receive, at a third time after the first time and before the second time, a request to store second data;
permit a second data production operation to store the second data to a second cache line of the plurality of cache lines as a result of the second retention level of the first cache line; and
update a retention status of the second cache line to the second retention level as a result of the second data production operation.

8. A method comprising:
storing, for a plurality of cache lines, retention statuses that designate different respective retention levels, the different respective retention levels including at least:
a first retention level that is assigned to cache lines managed according to a first cache replacement policy based on frequency of access; and
a second retention level that provides increased protection against data displacement relative to the first retention level;
detecting, at a first time, a first data production operation to store first data to a first cache line of a processing unit;
updating, based on storing the first data to the first cache line, a retention status of the first cache line to the second retention level, wherein data associated with the first cache line indicates the second retention level;
detecting, at a second time after the first time, a first data consumption operation retrieving the first data from the first cache line; and
updating, based on retrieving the first data from the first cache line, the retention status of the first cache line to the first retention level, the second retention level being a lower level of retention than the first retention level.

9. The method of claim 8, comprising:
permitting displacement of the first data stored on the first cache line based on the first retention level.

10. The method of claim 8, comprising:
detecting, at a third time after the second time, a second data consumption operation retrieving the first data from the first cache line; and
updating the retention status of the first cache line to a third retention level different than the first retention level and the second retention level.

11. The method of claim 10, wherein the third retention level is lower than the first retention level.

12. The method of claim 8, wherein updating the retention status to the first retention level includes setting a register of the processing unit to a defined value, and updating the retention status to the first retention level includes adjusting the defined value in the register by a defined amount.

13. The method of claim 8, comprising:
detecting, at a third time after the second time, a second data production operation to store second data to the first cache line; and
updating the retention status of the first cache line to the first second retention level as a result of the second data production operation.

14. The method of claim 8, comprising:
receiving, at a third time after the first time and before the second time, a request to store second data;
permitting a second data production operation to store the second data to a second cache line of the plurality of cache lines based on the second retention level of the first cache line; and
updating a retention status of the second cache line to the second retention level as a result of the second data production operation.

15. A computer system, comprising:
a processing unit that includes a processor core, cache memory, and a controller; and
a data source communicatively coupled to the processing unit, the controller configured to:
store, for a plurality of cache lines, retention statuses that designate different respective retention levels, the different respective retention levels including at least:
a first retention level that is assigned to cache lines managed according to a first cache replacement policy based on frequency of access; and
a second retention level that provides increased protection against data displacement relative to the first retention level;
detect, at a first time, a first data production operation to store first data provided by the data source to a first cache line of the cache memory;
update, based on storing the first data to the first cache line, a retention status of the first cache line to the second retention level, wherein data associated with the first cache line indicates the second retention level;
detect, at a second time after the first time, a first data consumption operation retrieving the first data from the first cache line; and
update, based on retrieving the first data from the first cache line, the retention status of the first cache line to the first retention level.

16. The computer system of claim 15, the controller configured to:
- detect, at a third time after the first time and before the second time, a second data consumption operation involving the first data stored on the first cache line; and
- maintaining the second retention level of the first cache line as a result of the second data consumption operation.

17. The computer system of claim 16, wherein the second data consumption operation involves a read operation of metadata of the first data.

18. The computer system of claim 15, the controller configured to:
- detect, at a third time after the second time, a second data consumption operation in which a first processor core reads the first data from the first cache line; and
- update the retention status of the first cache line to a third retention level different than the first retention level and the second retention level as a result of the second data consumption operation.

19. The computer system of claim 15, the controller configured to:
- permit displacement of the first data stored on the first cache line based on the first retention level.

20. The computer system of claim 15, the controller configured to:
- receive, at a third time after the first time and before the second time, a request to store second data;
- permit a second data production operation to store the second data to a second cache line of the plurality of cache lines as a result of the second retention level of the first cache line; and
- update a retention status of the second cache line to the second retention level as a result of the second data production operation.

* * * * *